United States Patent
Kuo et al.

(10) Patent No.: US 11,755,242 B2
(45) Date of Patent: Sep. 12, 2023

(54) DATA MERGING METHOD, MEMORY STORAGE DEVICE FOR UPDATING COPIED L2P MAPPING TABLE ACCORDING TO THE PHYSICAL ADDRESS OF PHYSICAL UNIT

(71) Applicant: PHISON ELECTRONICS CORP., Miaoli (TW)

(72) Inventors: Che-Yueh Kuo, New Taipei (TW); Li Hsun Lien, Taichung (TW)

(73) Assignee: PHISON ELECTRONICS CORP., Miaoli (TW)

( * ) Notice: Subject to any disclaimer, the term of this patent is extended or adjusted under 35 U.S.C. 154(b) by 137 days.

(21) Appl. No.: 16/988,731

(22) Filed: Aug. 10, 2020

(65) Prior Publication Data

US 2021/0397375 A1     Dec. 23, 2021

(30) Foreign Application Priority Data

Jun. 22, 2020 (TW) .................................. 109121048

(51) Int. Cl.
  *G06F 3/06*      (2006.01)
  *G06F 12/1009*   (2016.01)

(52) U.S. Cl.
  CPC .......... *G06F 3/0659* (2013.01); *G06F 3/0604* (2013.01); *G06F 3/065* (2013.01); *G06F 3/0679* (2013.01); *G06F 12/1009* (2013.01); *G06F 2212/657* (2013.01)

(58) Field of Classification Search
  CPC ..... G06F 3/0604; G06F 3/065; G06F 12/1009
  See application file for complete search history.

(56) References Cited

U.S. PATENT DOCUMENTS

| | | | | |
|---|---|---|---|---|
| 2017/0269873 A1* | 9/2017 | Tan | ........................ | G06F 3/0679 |
| 2019/0073298 A1* | 3/2019 | Wang | ................... | G06F 12/0246 |
| 2020/0081832 A1* | 3/2020 | Hsu | ........................ | G06F 3/0679 |
| 2020/0089608 A1* | 3/2020 | Chou | ................... | G06F 12/1009 |
| 2020/0201755 A1* | 6/2020 | Byun | .................... | G06F 3/0679 |

FOREIGN PATENT DOCUMENTS

| | | |
|---|---|---|
| CN | 110045913 | 7/2019 |
| CN | 110895514 | 3/2020 |
| TW | 201933102 | 8/2019 |
| TW | 202011195 | 3/2020 |

OTHER PUBLICATIONS

"Office Action of Taiwan Counterpart Application", dated Jul. 7, 2021, p. 1-p. 8.
"Office Action of China Counterpart Application", dated Mar. 31, 2023, p. 1-p. 8.

\* cited by examiner

*Primary Examiner* — David Yi
*Assistant Examiner* — Nicholas A. Paperno
(74) *Attorney, Agent, or Firm* — JCIPRNET

(57) ABSTRACT

A data merging method can copy a new logical to physical mapping table and update a copied logical to physical mapping table according to a physical address of a recycling unit expected to be written at the same time. In this way, the number of times that the same logic to physical mapping table is read multiple times during the data merging operation can be reduced to improve the execution efficiency of the data merging operation, thereby increasing the system performance of the memory storage device.

18 Claims, 14 Drawing Sheets

| PTE | ... | PTE(20) | ... | PTE(30) | ... | PTE(40) | ... | PTE(50) | ... |
|---|---|---|---|---|---|---|---|---|---|
| Identification information | ... | 1 | ... | 1 | ... | 1 | ... | 1 | ... |

DATA MERGING METHOD, MEMORY STORAGE DEVICE FOR UPDATING COPIED L2P MAPPING TABLE ACCORDING TO THE PHYSICAL ADDRESS OF PHYSICAL UNIT

CROSS-REFERENCE TO RELATED APPLICATION

This application claims the priority benefit of Taiwan application serial no. 109121048, filed on Jun. 22, 2020. The entirety of the above-mentioned patent application is hereby incorporated by reference herein and made a part of this specification.

BACKGROUND

1. Technology Field

The disclosure relates to a memory control technique, and more particularly, to a memory control method, a memory storage device and a memory control circuit unit.

2. Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

When the memory storage device leaves the factory, a part of management units in the memory storage device will be configured as a plurality of spare management units so the spare management units can be used to store new data. After a period of use, the number of spare management units in the memory storage device will gradually decrease. The memory storage device can execute a data merging operation (a.k.a. a garbage collection operation) to copy valid data from a plurality of source units to a recycling unit (a.k.a. a target unit) and erase the management units belonging to the source units in order to release new spare management units. However, in the data merging operation, it is often necessary to read the same logic to physical mapping table multiple times to obtain the required mapping information, thereby reducing an execution efficiency of the data merging operation.

SUMMARY

The disclosure provides a memory control method, a memory storage device and a memory control circuit unit, which are capable of solving the problems described above and/or improving a system performance of the memory storage device.

An exemplary embodiment of the disclosure provides a memory control method for a rewritable non-volatile memory module. The rewritable non-volatile memory module includes a plurality of management units, and the management units include a source unit and a recycling unit. The memory control method includes: collecting valid data from the source unit; copying a first logical to physical mapping table corresponding to the source unit to generate a second logical to physical mapping table; updating the second logical to physical mapping table according to a physical address of the recycling unit expected to be written, wherein the second logical to physical mapping table is recorded with mapping information corresponding to the recycling unit; copying the valid data from the source unit into the recycling unit; and updating first management information according to the second logical to physical mapping table.

An exemplary embodiment of the disclosure provides a memory storage device. The memory storage device includes a connection interface unit, a rewritable non-volatile memory module and a memory control circuit unit. The connection interface unit is configured to couple to a host system. The rewritable non-volatile memory module includes a plurality of management units, and the management units include a source unit and a recycling unit. The memory control circuit unit is coupled to the connection interface unit and the rewritable non-volatile memory module. The memory control circuit unit is configured to collect valid data from the source unit. The memory control circuit unit is further configured to copy a first logical to physical mapping table corresponding to the source unit to generate a second logical to physical mapping table. The memory control circuit unit is further configured to update the second logical to physical mapping table according to a physical address of the recycling unit expected to be written. Here, the second logical to physical mapping table is recorded with mapping information corresponding to the recycling unit. The memory control circuit unit is further configured to copy the valid data from the source unit into the recycling unit. The memory control circuit unit is further configured to update first management information according to the second logical to physical mapping table.

An exemplary embodiment of the disclosure provides a memory control circuit unit. The memory control circuit unit is configured to control a rewritable non-volatile memory module. The rewritable non-volatile memory module includes a plurality of management units, and the management units include a source unit and a recycling unit. The memory control circuit unit includes a host interface, a memory interface and a memory management circuit.

The host interface is configured to couple to a host system. The memory interface is configured to couple to the rewritable non-volatile memory module. The memory management circuit is coupled to the host interface and the memory interface. The memory management circuit is configured to collect valid data from the source unit. The memory management circuit is further configured to copy a first logical to physical mapping table corresponding to the source unit to generate a second logical to physical mapping table. The memory management circuit is further configured to update the second logical to physical mapping table according to a physical address of the recycling unit expected to be written. Here, the second logical to physical mapping table is recorded with mapping information corresponding to the recycling unit. The memory management circuit is further configured to copy the valid data from the source unit into the recycling unit. The memory management circuit is further configured to update first management information according to the second logical to physical mapping table.

Based on the above, the memory management circuit can copy the new logical to physical mapping table and update the copied logical to physical mapping table according to the physical address of the recycling unit expected to be written at the same time. In this way, the number of times that the same logic to physical mapping table is read multiple times during the data merging operation can be reduced to improve the execution efficiency of the data merging operation, thereby increasing the system performance of the memory storage device.

To make the aforementioned more comprehensible, several embodiments accompanied with drawings are described in detail as follows.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

BRIEF DESCRIPTION OF THE DRAWINGS

FIG. 11 is a schematic diagram illustrating second management information according to an exemplary embodiment of the disclosure.

DESCRIPTION OF THE EMBODIMENTS

Figure 1:
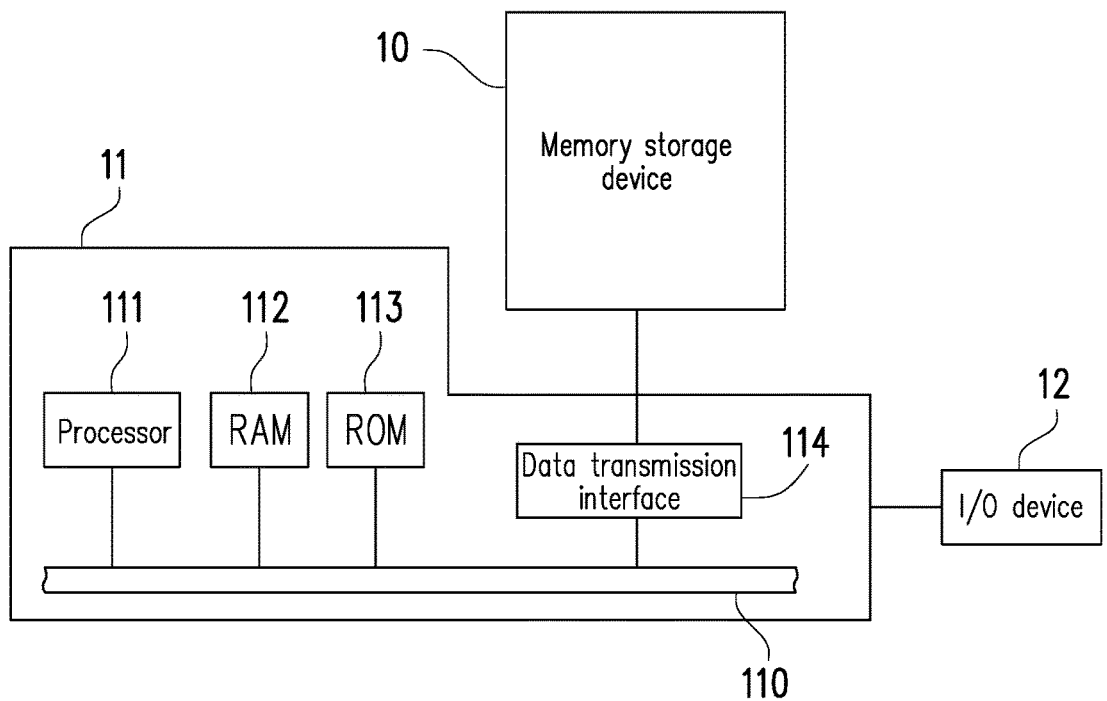
FIG. 1 is a schematic diagram illustrating a host system, a memory storage device and an I/O (input/output) device according to an exemplary embodiment of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Embodiments of the present disclosure may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
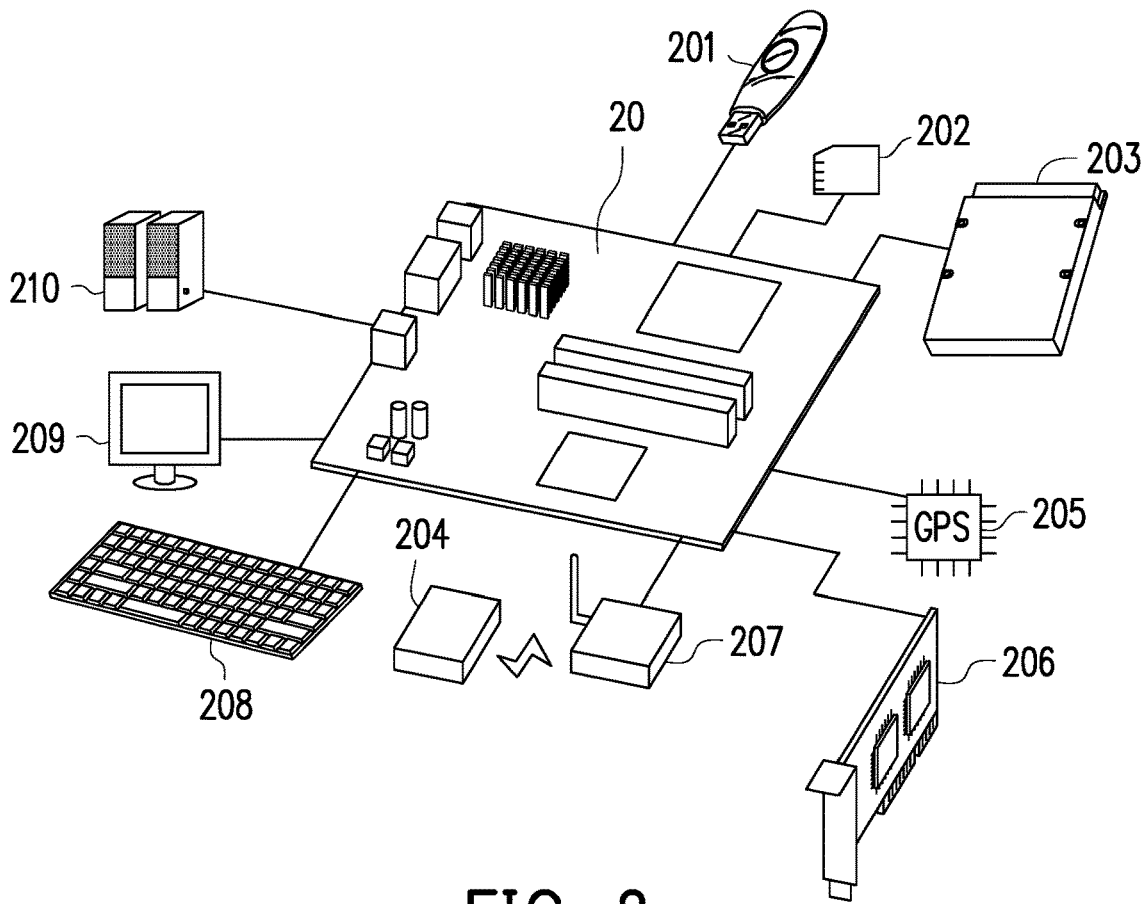
FIG. 2 is a schematic diagram illustrating a host system, a memory storage device and an I/O device according to another exemplary embodiment of the disclosure.

FIG. 1 is a schematic diagram illustrating a host system, a memory storage device and an I/O (input/output) device according to an exemplary embodiment of the disclosure. FIG. 2 is a schematic diagram illustrating a host system, a memory storage device and an I/O device according to another exemplary embodiment of the disclosure.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In this exemplary embodiment, the host system 11 is coupled to a memory storage device 10 through the data transmission interface 114. For example, the host system 11 can store data into the memory storage device 10 or read data from the memory storage device 10 via the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 can be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, an SSD (Solid State Drive) 203 or a wireless memory storage device 204. The wireless memory storage device may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
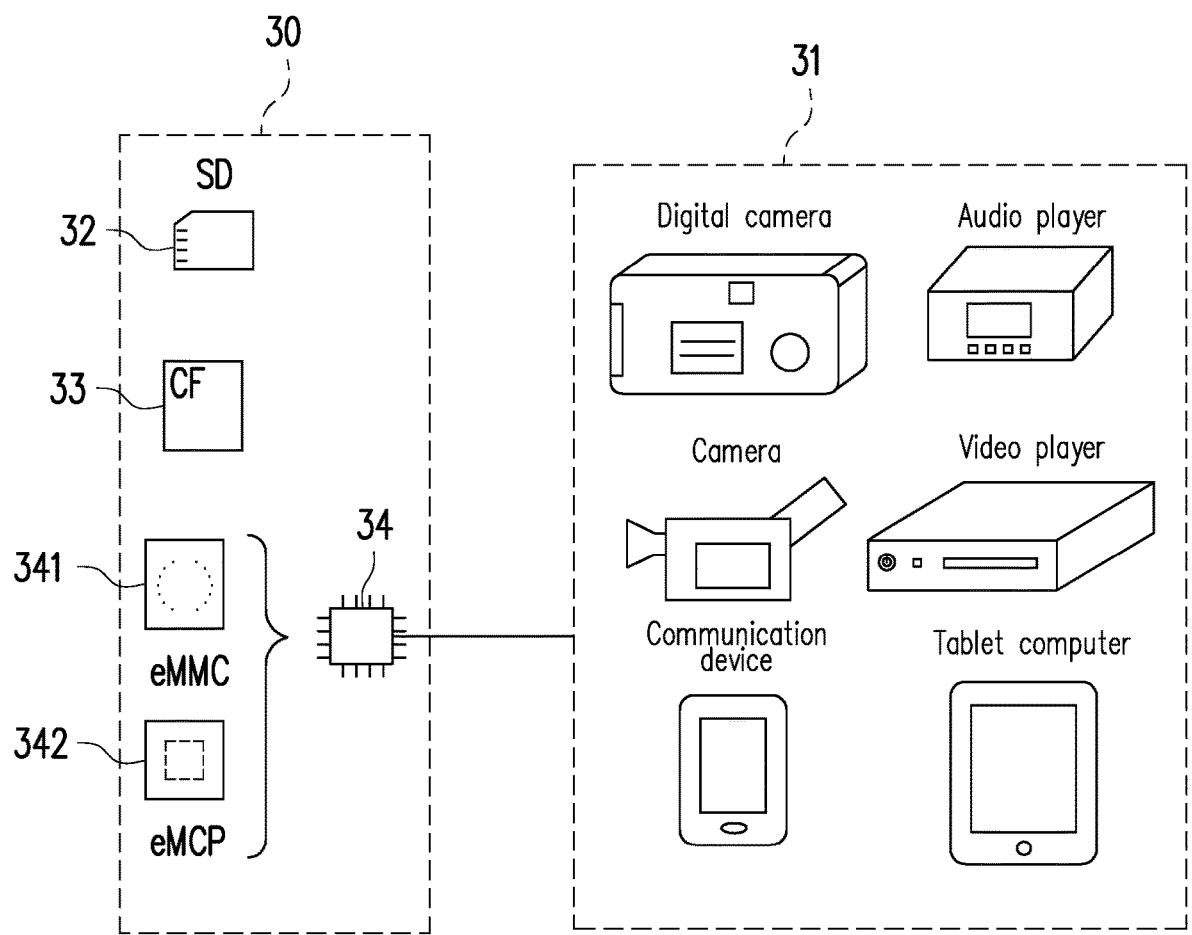
FIG. 3 is a schematic diagram illustrating a host system and a memory storage device according to another exemplary embodiment of the disclosure.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the disclosure. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
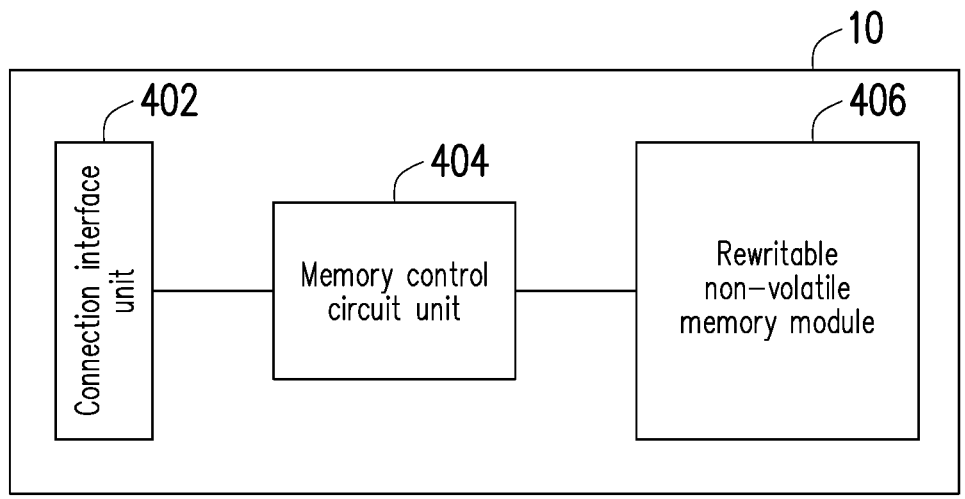
FIG. 4 is a schematic block diagram illustrating a memory storage device according to an exemplary embodiment of the disclosure.

FIG. 4 is a schematic block diagram illustrating a memory storage device according to an exemplary embodiment of the disclosure.

Referring to FIG. 4, the memory storage device 10 includes a connection interface unit 402, a memory control circuit unit 404 and a rewritable non-volatile memory module 406.

The connection interface unit 402 is configured to couple to the memory storage device 10 to the host system 11. The memory storage device 10 can communicate with the host system 11 through the connection interface unit 402. In this exemplary embodiment, the connection interface unit 402 is compatible with a SATA (Serial Advanced Technology Attachment) standard. Nevertheless, it should be understood that the disclosure is not limited in this regard. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 is distributed outside of a chip containing the memory control circuit unit 404.

The memory control circuit unit 404 is configured to execute a plurality of logic gates or control commands which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), an MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), a QLC (Qual Level Cell) NAND-type flash memory module (i.e., a flash memory module capable of storing four bits in one memory cell), other flash memory modules or other memory modules having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". With changes in the threshold voltage, each of the memory cells in the rewritable non-volatile memory module 406 has a plurality of storage states. The storage state to which the memory cell belongs may be determined by applying a read voltage to the memory cell, so as to obtain the one or more bits stored in the memory cell.

In this exemplary embodiment, the memory cells of the rewritable non-volatile memory module 406 may constitute a plurality of physical programming units, and the physical programming units can constitute a plurality of physical erasing units. Specifically, the memory cells on the same word line may constitute one or more of the physical programming units. If each of the memory cells can store two or more bits, the physical programming units on the same word line may be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In this exemplary embodiment, the physical programming unit is the minimum unit for programming. That is, the physical programming unit is the minimum unit for writing data. For example, the physical programming unit may be a physical page or a physical sector. If the physical programming unit is the physical page, these physical programming units may include a data bit area and a redundancy bit area. The data bit area includes multiple physical sectors configured to store user data, and the redundant bit area is configured to store system data (e.g., management data such as the error correcting code). In this exemplary embodiment, the data bit area contains 32 physical sectors, and a size of each physical sector is 512 bytes (B). However, in other exemplary embodiments, the data bit area may also contain 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
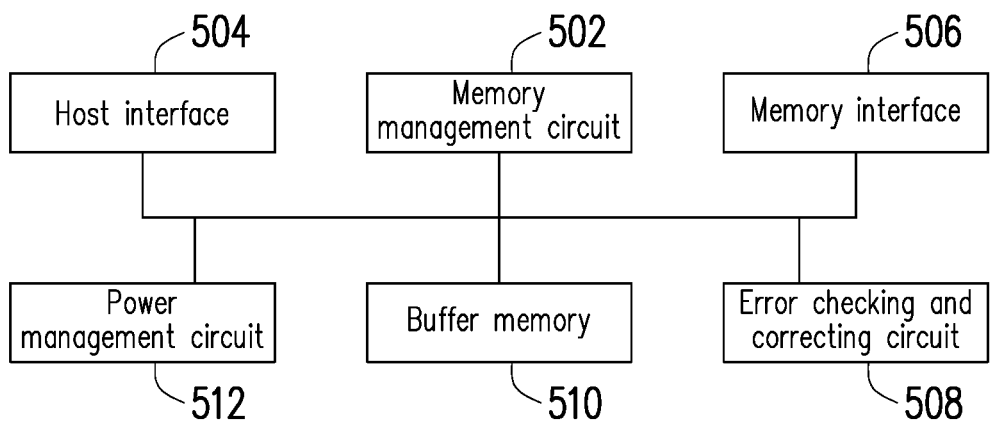
FIG. 5 is a schematic block diagram illustrating a memory control circuit unit according to an exemplary embodiment of the disclosure.

FIG. 5 is a schematic block diagram illustrating a memory control circuit unit according to an exemplary embodiment of the disclosure.

Referring to FIG. 5, the memory control circuit unit 404 includes a memory management circuit 502, a host interface 504 and a memory interface 506.

The memory management circuit 502 is configured to control overall operation of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In this exemplary embodiment, the control commands of the memory management circuit 502 are implemented in form of firmware. For instance, the memory management circuit 502 has a microprocessor unit (not illustrated) and a read-only memory (not illustrated), and the control commands are burnt into the read-only memory. During operation of the memory storage device 10, the control commands are executed by the microprocessor to perform operations of writing, reading or erasing data.

In another exemplary embodiment, the control commands of the memory management circuit 502 may also be stored as program codes in a specific area (e.g., the system area in a memory exclusively used for storing system data) of the rewritable non-volatile memory module 406. In addition, the memory management circuit 502 has a microprocessor unit (not illustrated), a ROM (not illustrated) and a RAM (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to execute operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of a memory cell group of the rewritable non-volatile memory module 406. The memory writing circuit is configured to issue a write command sequence for the rewritable non-volatile memory module 406 to write data into the rewritable non-volatile memory module 406. The memory reading circuit is configured to issue a read command sequence for the rewritable non-volatile memory module 406 to read data from the rewritable non-volatile memory module 406. The memory erasing circuit is configured to issue an erase command sequence for the rewritable non-volatile memory module 406 to erase data from the rewritable non-volatile memory module 406. The data processing circuit is configured to process data to be written into the rewritable non-volatile memory module 406 and data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502. The memory management circuit 502 can communicate with the host system 11 through the host interface 504. The host interface 504 may be used to receive and identify commands and data transmitted by the host system 11. For example, the commands and the data transmitted by the host system 11 may be transmitted to the memory management circuit 502 via the host interface 504. In addition, the memory management circuit 502 can transmit data to the host system 11 via the host interface 504. In this exemplary embodiment, the host interface 504 is compatible with the SATA standard. Nevertheless, it should be understood that the disclosure is not limited in this regard. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 sends corresponding command sequences. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection operation). These command sequences are generated by the memory management circuit 502 and transmitted to the rewritable non-volatile memory module 406 via the memory interface 506, for example. The command sequences may include one or more signals, or data transmitted in the bus. The signals or the data may include command codes and program codes. For example, information such as identification codes and memory addresses are included in the read command sequence;

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to execute an error checking and correcting operation to ensure the correctness of data. Specifically, when the memory management circuit 502 receives the writing command from the host system 11, the error checking and correcting circuit 508 generates an error correcting code (ECC) or an error detecting code (EDC) for data corresponding to the writing command, and the memory management circuit 502 writes data and the ECC or the EDC corresponding to the writing command to the rewritable non-volatile memory module 406. Then, when the memory management circuit 502 reads the data from the rewritable non-volatile memory module 406, the corresponding ECC and/or the EDC are also read, and the error checking and correcting circuit 508 executes the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

In an exemplary embodiment, the rewritable non-volatile memory module 406 of FIG. 4 is also known as a flash memory module; the memory control circuit unit 404 is also known as a flash memory controller for controlling the flash memory module; and/or the memory management circuit 502 of FIG. 5 is also known as a flash memory management circuit.

Figure 6:
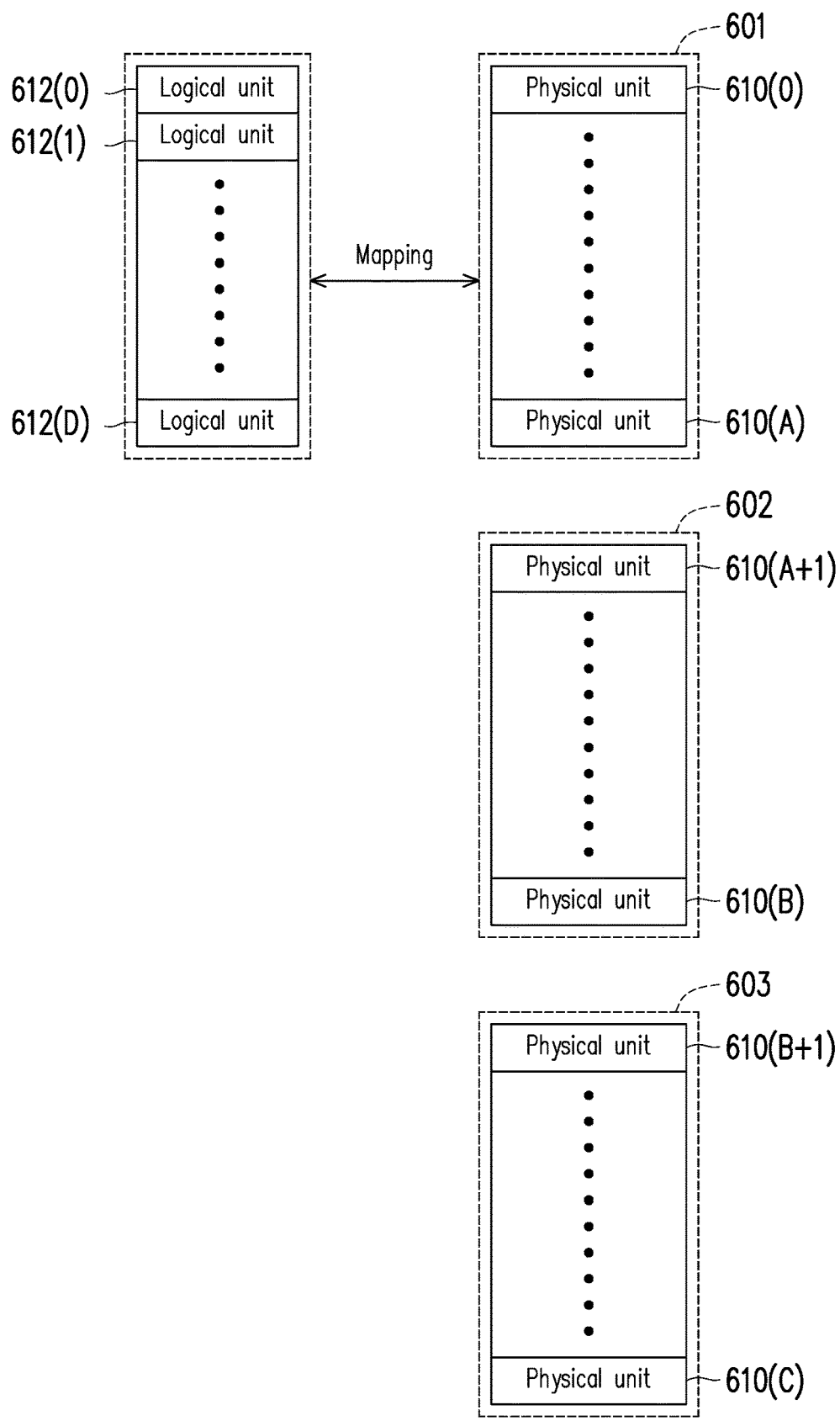
FIG. 6 is a schematic diagram illustrating management of a rewritable non-volatile memory module according to an exemplary embodiment of the disclosure.

FIG. 6 is a schematic diagram illustrating management of a rewritable non-volatile memory module according to an exemplary embodiment of the disclosure. With reference to FIG. 6, the memory management circuit 502 can logically group physical nodes 610(0) to 610(C) of the rewritable non-volatile memory module 406 into a storage area 601, a spare area 602 and a system area 603. The physical nodes 610(0) to 610(A) in the storage area 601 are stored with data. For example, the physical nodes 610(0) to 610(A) in the storage area 601 can store valid data and invalid data. The physical nodes 610(A+1) to 610(B) in the spare area 602 are not yet stored with data (e.g., the valid data). The physical nodes 610(B+1) to 610(C) in the system area 603 are configured to store system data, such as a logical to physical mapping table, a bad block management table, a device model or management data of other types.

One physical node can contain one or more physical addresses. One physical address can be composed of a plurality of memory cells. When data are to be stored, the memory management circuit 502 can select at least one physical node from the physical nodes 610(A+1) to 610(B) in the spare area 602 and store data from the host system 11 or from at least one physical node in the storage area 601 into the selected physical node. Meanwhile, the selected physical node is associated with the storage area 601. In addition, after one physical node in the storage area 601 is erased, that erased physical node is re-associated with the spare area 602.

The memory management circuit 502 can assigns logical units 612(0) to 612(D) for mapping to the physical nodes 610(0) to 610(A) in the storage area 601. One logical unit may contain one or more logical addresses. Each of the logical units 612(0) to 612(D) can also be mapped to one or more physical nodes. It should be noted that, the memory management circuit 502 may not assign logical units for mapping to the system area 603, so as to prevent the system data stored in the system area 603 from being changed by users.

The memory management circuit 502 can record a mapping relation (a.k.a. logical to physical address mapping information or mapping information) between the logical unit and the physical node in at least one logical to physical mapping table. The logical to physical mapping table is stored in the physical nodes 610(B+1) to 610(C) in the system area 603. When the host system 11 intends to read data from the memory storage device 10 or write data into the memory storage device 10, the memory management circuit 502 can execute a data accessing operation on the memory storage device 10 according to the logical to physical mapping table.

The memory management circuit 502 can manage and access the physical nodes in the rewritable non-volatile memory module 406 based on a management unit. One management unit is also known as a virtual block (VB). One management unit can contain a plurality of physical nodes. For example, one management unit may cover the physical nodes belonging to a plurality of planes (a.k.a. memory planes) and/or a plurality of chip enables (CE) in the rewritable non-volatile memory module 406. Further, one management unit can be associated with the storage area 601, the spare area 602 or the system area 603. The management unit belonging to the spare area 602 is also known as a spare management unit. The management unit belonging to the storage area 601 is also known as a non-spare management unit.

It should be noted that, the valid data are the latest data belonging to one specific logical unit, and the invalid data are the latest data not belonging to any logical unit. For example, if the host system 11 stores new data into one specific logical unit to overwrite old data originally stored in that specific logical unit (i.e., update the data of that specific logical unit), this new data stored in the storage area 601 is the latest data belonging to that logical unit and marked as valid, whereas the old data being overwritten may still be stored in the storage area 601 but marked as invalid.

In this exemplary embodiment, if data belonging to one specific logical unit is updated, a mapping relation between that specific logical unit and the physical node stored with the old data belonging to that specific logical unit will be removed, and a mapping relation between that specific logical unit and the physical node stored with the latest data belonging to that logical unit will be established. However, in another exemplary embodiment, if data belonging to one specific logical unit is updated, a mapping relation between that specific logical unit and the physical node stored with the old data belonging to that logical unit can still be maintained.

When the memory storage device 10 leaves the factory, a total number of the management units belonging to the spare area 602 is a predetermined number (e.g., 30). During operation of the memory storage device 10, there will be increasingly more management units being selected from the spare area 602 and associated with the storage area 601 for storing data (e.g., the user data from the host system 11). Accordingly, the total number of the management units belonging to the spare area 602 will gradually decrease with use of the memory storage device 10 over time.

During operation of the memory storage device 10, the memory management circuit 502 can continuously update the total number of the management units belonging to the spare area 602. The memory management circuit 502 can execute a data merging operation according to the number of the management units in the spare area 602 (i.e., a total number of the spare management units). For example, the memory management circuit 502 can determine whether the total number of the management units belonging to the spare area 602 is less than or equal to a threshold (a.k.a. a first threshold). The first threshold may be, for example, 2 or a greater value (e.g., 10), which is not particularly limited by the disclosure. If the total number of the management units belonging to the spare area 602 is less than or equal to the first threshold, the memory management circuit 502 can execute the data merging operation. In an exemplary embodiment, the data merging operation is also known as a garbage collection (GC) operation.

In the data merging operation, the memory management circuit 502 can select at least one management unit from the storage area 601 as a source unit and select at least one management unit from the spare area 602 as a recycling unit. The memory management circuit 502 can send at least one command sequence to instruct the rewritable non-volatile memory module 406 to copy the valid data from the management unit served as the source unit to the management units served as the recycling unit. The management unit served as the recycling unit and fully written with the valid data can be associated with the storage area 601. After the valid data stored by one specific management unit is completely copied into the recycling unit, that specific management unit can be erased and associated with the spare area 602. In an exemplary embodiment, the operation of re-associating one specific physical node from the storage area 601 back to the spare area 602 (or the operation of erasing one management unit) is also known as releasing one spare management unit. By performing the data merging operation, one or more spare management units will be released so the total number of the management units belonging to the spare area 602 can be gradually increased.

After the data merging operation is initiated, if the management units belonging to the spare area 602 match a specific condition, the data merging operation can be stopped. For example, the memory management circuit 502 can determine whether the total number of the management units belonging to the spare area 602 is greater than or equal to one threshold (also referred to as a second threshold hereinafter). For example, the second threshold can be greater than or equal to the first threshold. If the total number of the management units belonging to the spare area 602 is greater than or equal to the second threshold, the memory management circuit 502 can stop the data merging operation. It should be noted that, stopping the data merging operation refers to ending the data merging operation currently in process. After one data merging operation is stopped, if the total number of the management units belonging to the spare area 602 is less than or equal to the first threshold again, the next data merging operation can be executed again to try to release the new management units.

Figure 7:
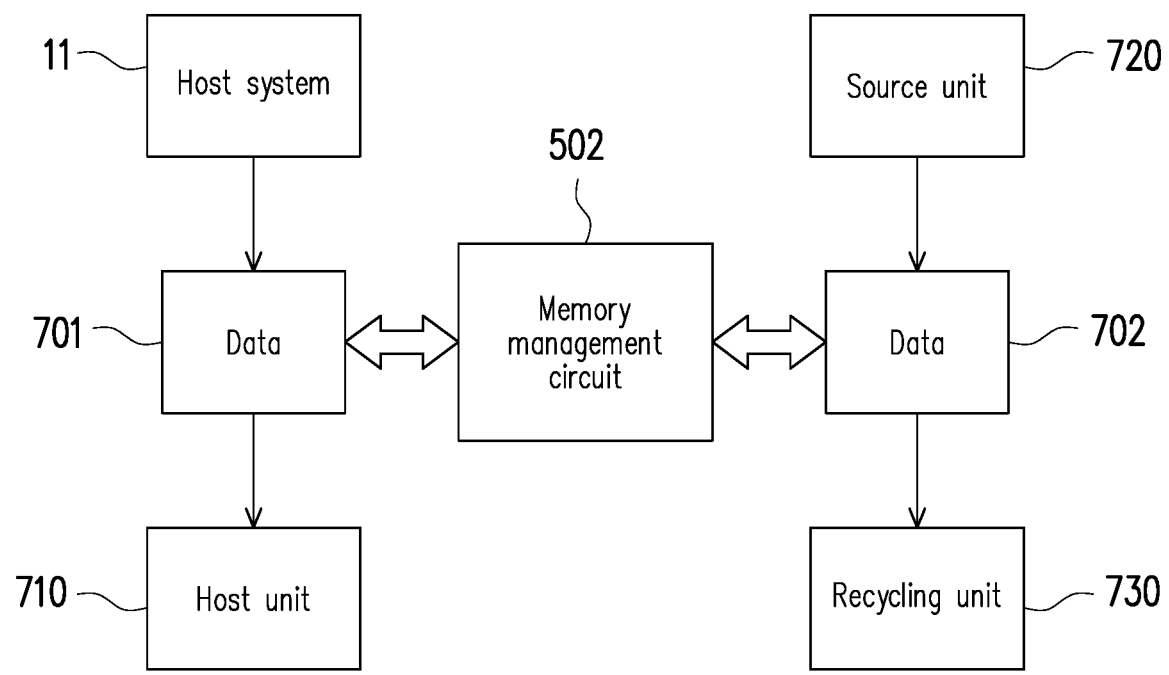
FIG. 7 is a schematic diagram illustrating a host writing operation and a data merging operation according to an exemplary embodiment of the disclosure.

FIG. 7 is a schematic diagram illustrating a host writing operation and a data merging operation according to an exemplary embodiment of the disclosure. Referring to FIG. 7, in the host writing operation, the host system 11 can send at least one write command as an instruction for writing data 701 into one or more logical units (or logical addresses). According to the write command, the memory management circuit 502 can store the data 701 into a host unit 710 mapped to the logical units (or logical addresses). For example, the host unit 710 can contain one specific management unit selected from the spare area 602 of FIG. 6.

On the other hand, the memory management circuit 502 can initiate one data merging operation to release the new spare management unit. For example, in the data merging operation, data 702 can be collected from at least one management unit served as a source unit 720 and written into at least one management unit served as a recycling unit 730. The data 702 includes the valid data stored in the source unit 720. If the valid data stored by one specific management unit served as the source unit 720 is completely copied into the recycling unit 730, that specific management unit can be erased to become the new spare management unit. Accordingly, the number of the spare management units in the spare area 602 of FIG. 6 can be gradually increased.

Figure 8:
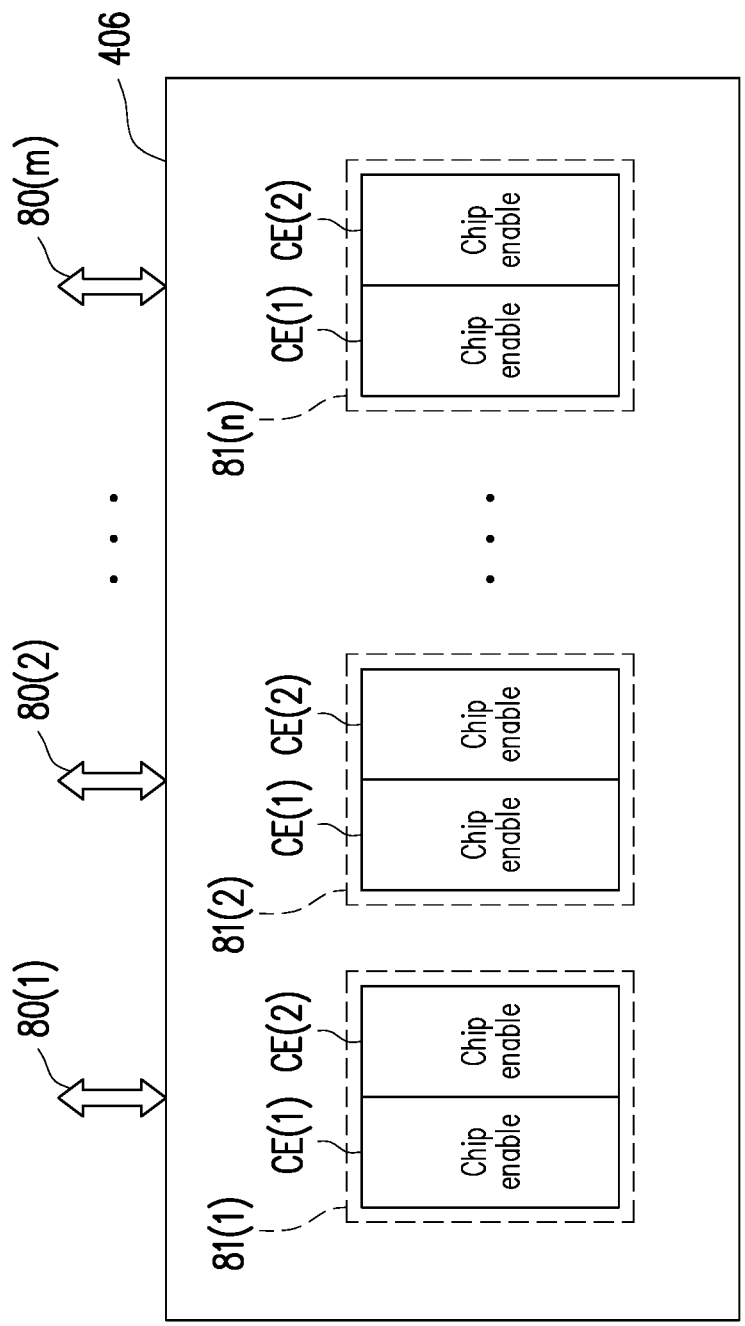
FIG. 8 is a schematic diagram illustrating management of a rewritable non-volatile memory module according to an exemplary embodiment of the disclosure.

FIG. 8 is a schematic diagram illustrating management of a rewritable non-volatile memory module according to an exemplary embodiment of the disclosure. Referring to FIG. 8, the rewritable non-volatile memory module 406 includes management units 81(1) to 81(n). Each of the management units 81(1) to 81(n) contains chip enables (a.k.a. chip enable groups) CE(1) and CE(2). Each of the chip enables CE(1) and CE(2) contains a plurality of physical nodes. The memory management circuit 502 can access the management units 81(1) to 81(n) through channels 80(1) to 80(m). For example, the memory management circuit 502 can access the management units 81(1) and 81(2) in parallel (or interleavedly) through at least two channels of the channels 80(1) to 80(m). In addition, each of the chip enables CE(1) and CE(2) may contain a plurality of planes (e.g., planes PL(1) and PL(2) of FIG. 9).

Figure 9:
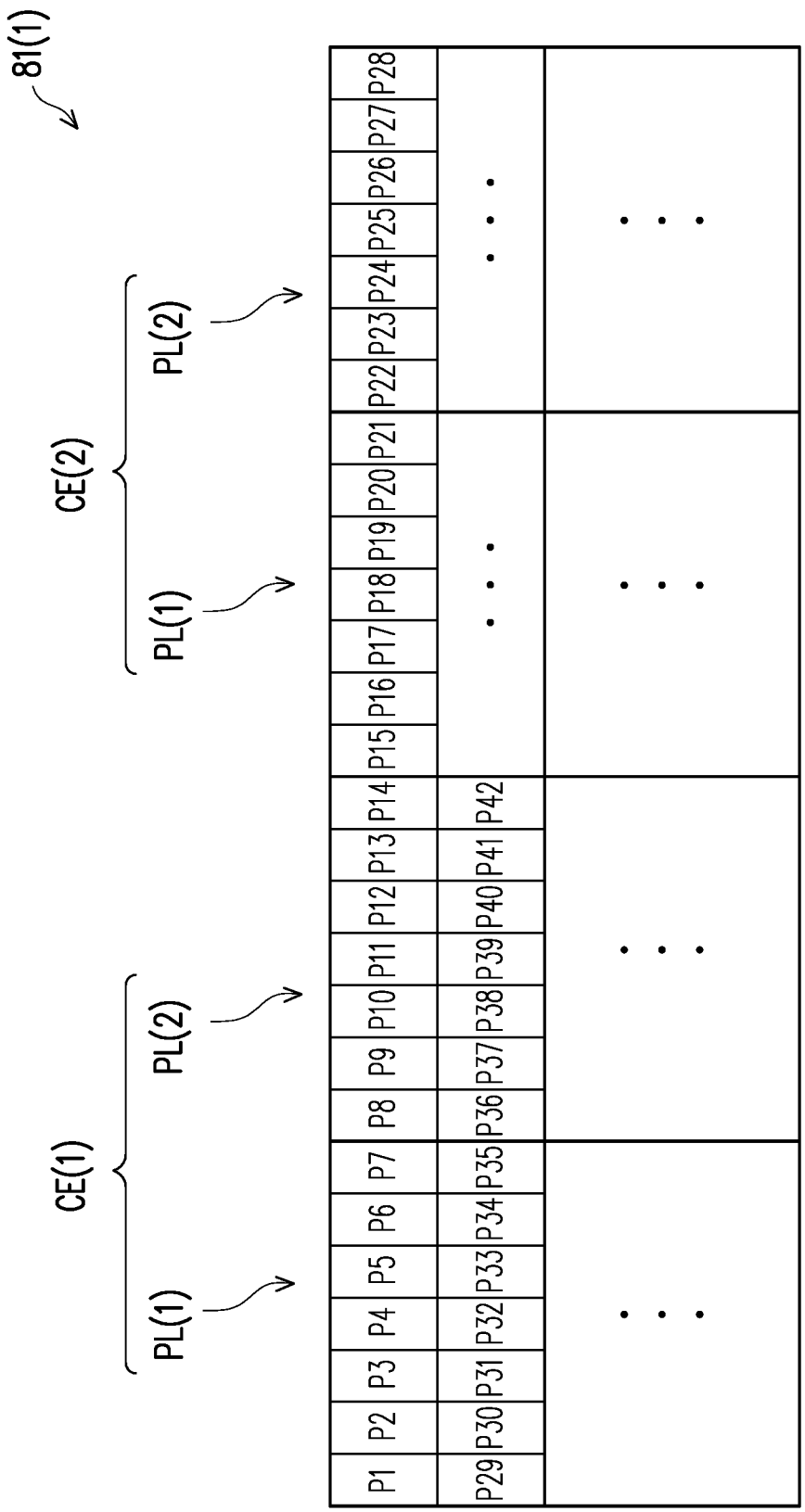
FIG. 9 is a schematic diagram illustrating a management unit according to an exemplary embodiment of the disclosure.

FIG. 9 is a schematic diagram illustrating a management unit according to an exemplary embodiment of the disclosure. With reference to FIG. 9 in which the management unit 81(1) is used as an example, the plane PL(1) in the chip enable CE(1) may include physical nodes P1 to P7, P29 to P35, etc.; the plane PL(2) in the chip enable CE(1) may include physical nodes P8 to P14, P36 to P42, etc.; the plane PL(1) in the chip enable CE(2) may include physical nodes P15 to P21, etc.; and the plane PL(2) in the chip enable CE(2) may include physical nodes P22 to P28, etc. The physical nodes P1 to P28 may be accessed in parallel (or interleavedly) to improve an access efficiency.

In an exemplary embodiment, a plurality of consecutive physical nodes in one plane (e.g., the physical nodes P1 to P7) may be referred to as one physical unit. Alternatively, in an exemplary embodiment, a plurality of consecutive physical nodes in one chip enable (e.g., the physical nodes P1 to P14) may be referred to as one physical unit. Alternatively, in an exemplary embodiment, a plurality of consecutive physical nodes in multiple planes (e.g., the physical nodes P1 to P28) may be referred to as one physical unit.

In an exemplary embodiment, the memory management circuit 502 can maintain specific management information (a.k.a. first management information) in the rewritable non-volatile memory module 406. The first management information includes a physical address of each logical to physical mapping table. In addition, the memory management circuit 502 can maintain specific management information (a.k.a. second management information) in the rewritable non-volatile memory module 406. The second management information can include index information for reading logical to physical mapping information related to the valid data stored by the management unit.

In an exemplary embodiment, after starting the data merging operation, the memory management circuit 502 can read the first management information and the second management information from the rewritable non-volatile memory module 406, obtain at least part of logical to physical mapping tables according to the first management information and the second management information, and analyze a data amount of the valid data stored in at least part of the management units and/or a storage location of the valid data according to the logical to physical mapping table. Then, according to an analysis result, the memory management circuit 502 can select at least one management unit as the source unit and collect the valid data from it. After the source unit is identified, the valid data can be read from the source unit and sequentially written into the recycling unit. In response to the valid data being moved from the source unit to the recycling unit for storage, the memory management circuit 502 reads the first management information and the second management information, and updates mapping information of the valid data in a logical to physical mapping table corresponding to the source unit to reflect that the valid data has been moved to the recycling unit for storage.

However, it takes time to read and analyze the logical to physical mapping table. During the data merging operation, in the two stages of selecting the source and updating the mapping information of the valid data in the logical to physical mapping table corresponding to the source unit, the memory management circuit 502 often needs to read the same logic to physical mapping table multiple times to obtain the required mapping information, thereby reducing an execution efficiency of the data merging operation.

Figure 10:
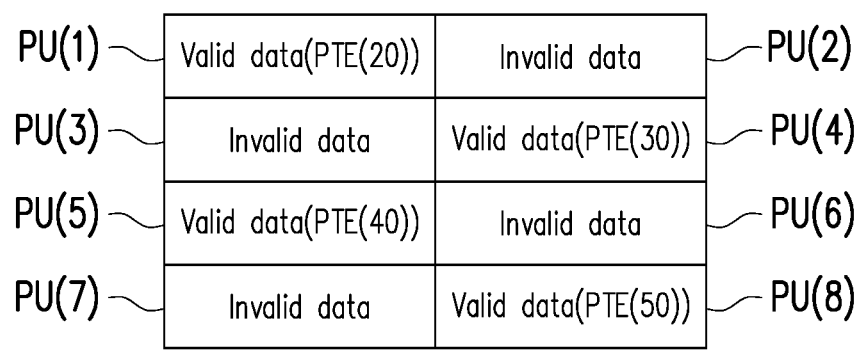
FIG. 10 is a schematic diagram illustrating a management unit according to an exemplary embodiment of the disclosure.

FIG. 10 is a schematic diagram illustrating a management unit according to an exemplary embodiment of the disclosure. FIG. 11 is a schematic diagram illustrating second management information according to an exemplary embodiment of the disclosure. Referring to FIG. 10 and FIG. 11, in this exemplary embodiment, it is assumed that the management unit 81(1) is selected as the source unit; physical units PU(1), PU(4), PU(5) and PU(8) can be identified as first physical units from which the valid data are collected; and physical units PU(2), PU(3), PU(6) and PU(7) stores the invalid data and are identified as second physical unit. In this exemplary embodiment, mapping information of the valid data stored PU(1), PU(4), PU(5) and PU(8) are respectively stored in logical to physical mapping tables PTE(20), PTE(30), PTE(40) and PTE(50). Further, in this exemplary embodiment, it is assumed that the second management information includes table information 1101, and the table information 1101 may be used to identify the management unit 81(1) as the source unit. For example, a table 1101 records logical to physical mapping tables PTE and corresponding identification information. The identification information of the logical to physical mapping tables PTE(20), PTE(30), PTE(40) and PTE(50) are bit "1", indicating that the management units mapped by the logical to physical mapping tables PTE(20), PTE(30), PTE(40) and PTE(50) are stored with the valid data. Further, according to these logical to physical mapping tables, the memory management circuit 502 can analyze and select at least one management unit as the source unit and collect the valid data therefrom. For example, the management unit 81(1) is selected as the source unit in this exemplary embodiment. In addition, the first management information records physical addresses of the logical to physical mapping tables PTE(20), PTE(30), PTE(40) and PTE(50).

Figure 12:
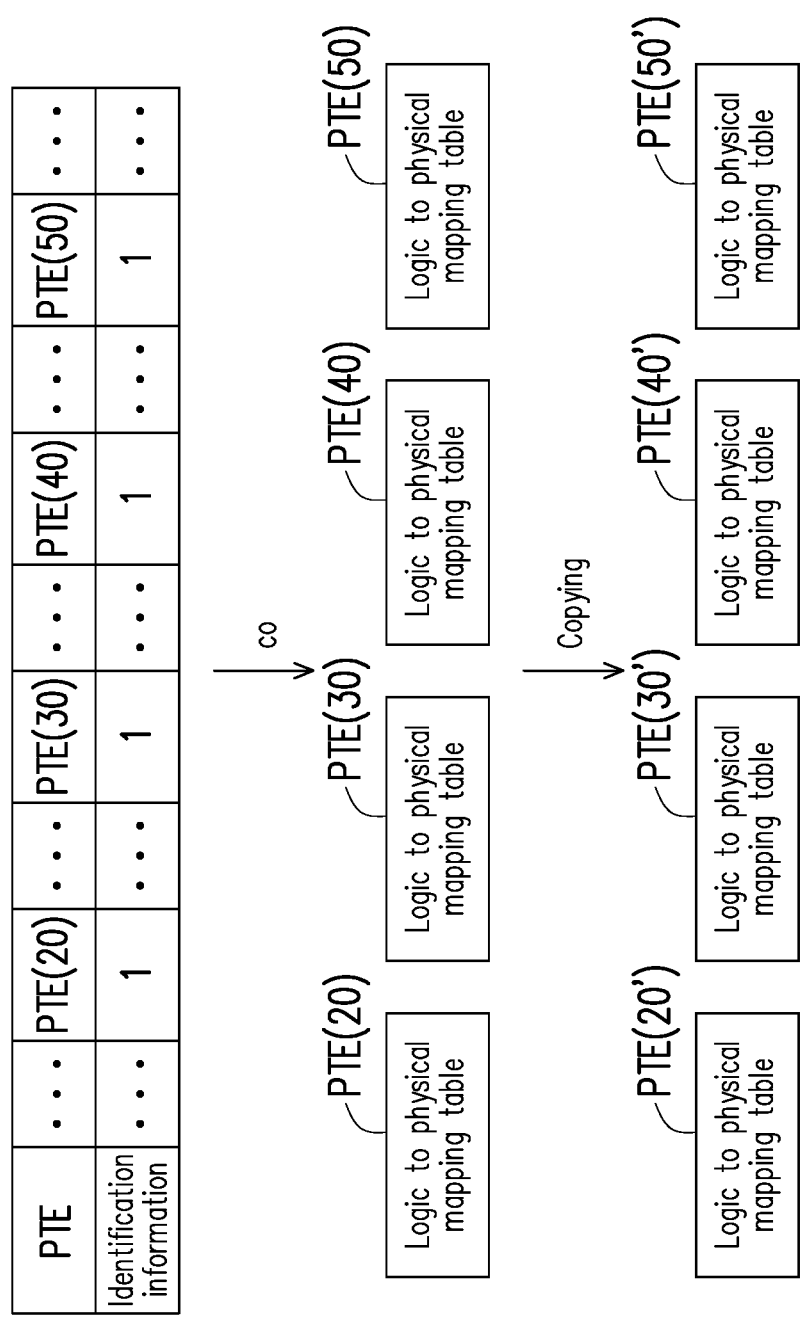
FIG. 12 is a schematic diagram illustrating a data merging operation according to an exemplary embodiment of the disclosure.
Figure 13:
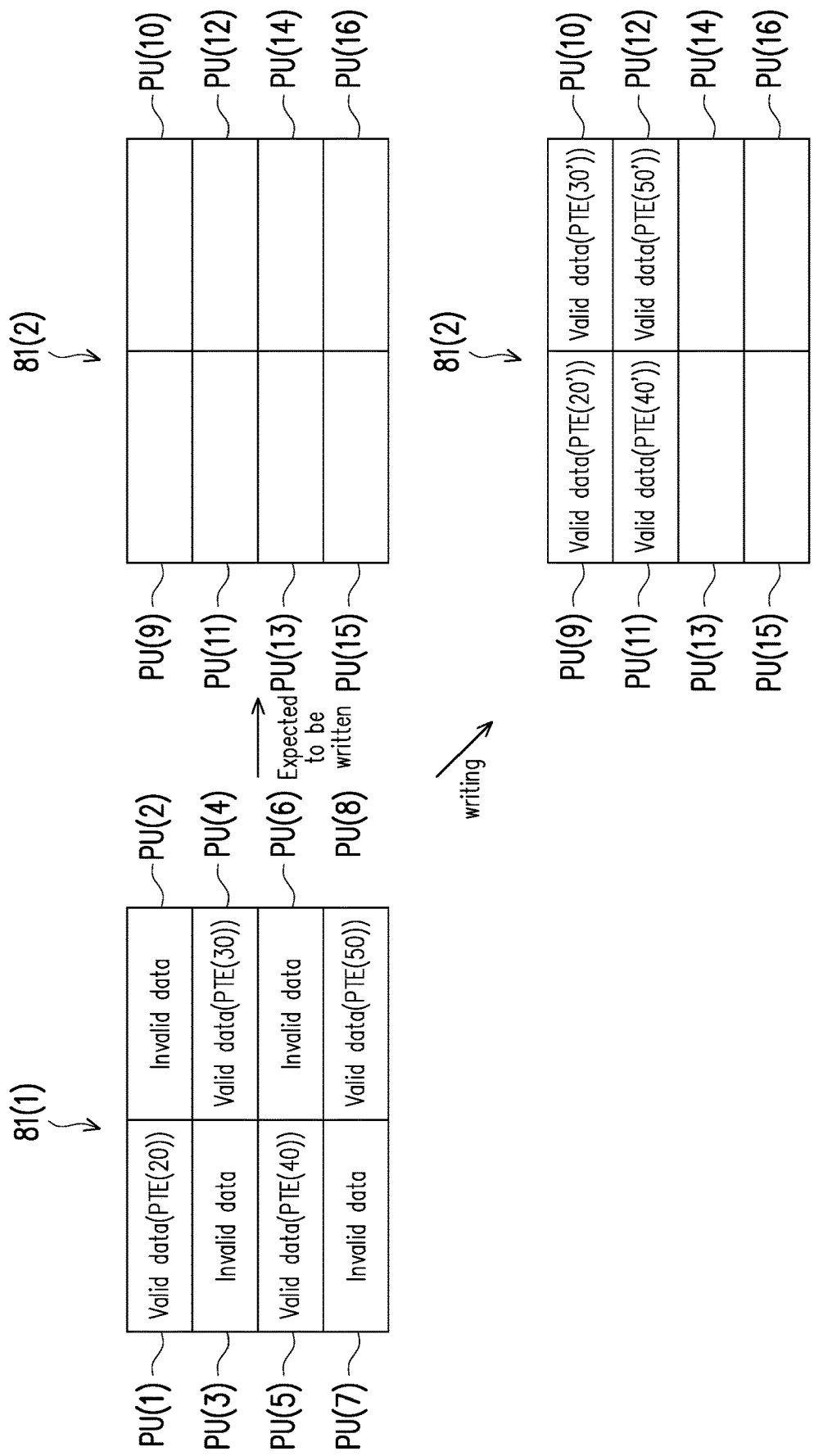
FIG. 13 is a schematic diagram illustrating a data merging operation according to an exemplary embodiment of the disclosure.

FIG. 12 is a schematic diagram illustrating a data merging operation according to an exemplary embodiment of the disclosure. FIG. 13 is a schematic diagram illustrating a data merging operation according to an exemplary embodiment of the disclosure. Referring to FIG. 12, after the management unit 81(1) is selected as the source unit and the physical units PU(1), PU(4), PU(5) and PU(8) are identified as the first physical units, the valid data may be read from the physical units PU(1), PU(4), PU(5) and PU(8).

In an exemplary embodiment, in response to the valid data being collected, the memory management circuit 502 can copy a first logical to physical mapping table corresponding to the management unit 81(1) to generate a second logical to physical mapping table. Taking FIG. 12 for example, after the valid data are collected, the memory management circuit 502 reads and copies the logical to physical mapping tables PTE(20), PTE(30), PTE(40) and PTE(50) to generate logical to physical mapping tables PTE(20'), PTE(30') PTE(40') and PTE(50') (a.k.a. the second logical to physical mapping table) and temporarily store them into the buffer memory 510.

After the new logical to physical mapping tables are copied, the memory management circuit 502 updates the copied and generated logical to physical mapping tables according to a physical address of the recycling unit expected to be written. Referring to FIG. 13, the memory management circuit 502 expects to write the valid data collected from the management unit 81(1) into physical units PU(9) to PU(12) in the management unit 81(2) (a.k.a. the recycling unit). It should be noted that, the collected valid data are not yet written into the physical units PU(9) to PU(12) in the management unit 81(2) at the time. Here, the memory management circuit 502 updates the logical to physical mapping tables PTE(20'), PTE(30'), PTE(40') and PTE(50') according to physical addresses of the physical units PU(9) to PU(12). The memory management circuit 502 can update mapping information between the logical address and the physical address corresponding to the valid data in the logical to physical mapping tables PTE(20'), PTE(30'), PTE(40') and PTE(50').

In this exemplary embodiment, the memory management circuit 502 can remove a mapping relation between a physical node belonging to the physical unit PU(1) and a logical address corresponding to the physical node in the logical to physical mapping table PTE(20'), and establish a mapping relation between that logical address and the physical node belonging to the physical unit PU(9). Similarly, the mapping relations between the logical addresses and the physical nodes belonging to the physical units PU(10), PU(11) and PU(12) are established separately in the same manner.

After the logical to physical mapping tables PTE(20'), PTE(30'), PTE(40') and PTE(50') are updated, the memory management circuit 502 copies the valid data from the management unit 81(1) to the management unit 81(2). Referring to FIG. 13, the memory management circuit 502 sequentially writes the valid data collected from the physical units PU(1), PU(4), PU(5) and PU(8) in the management unit 81(1) into the physical units PU(9) to PU(12) in the management unit 81(2).

Figure 14:
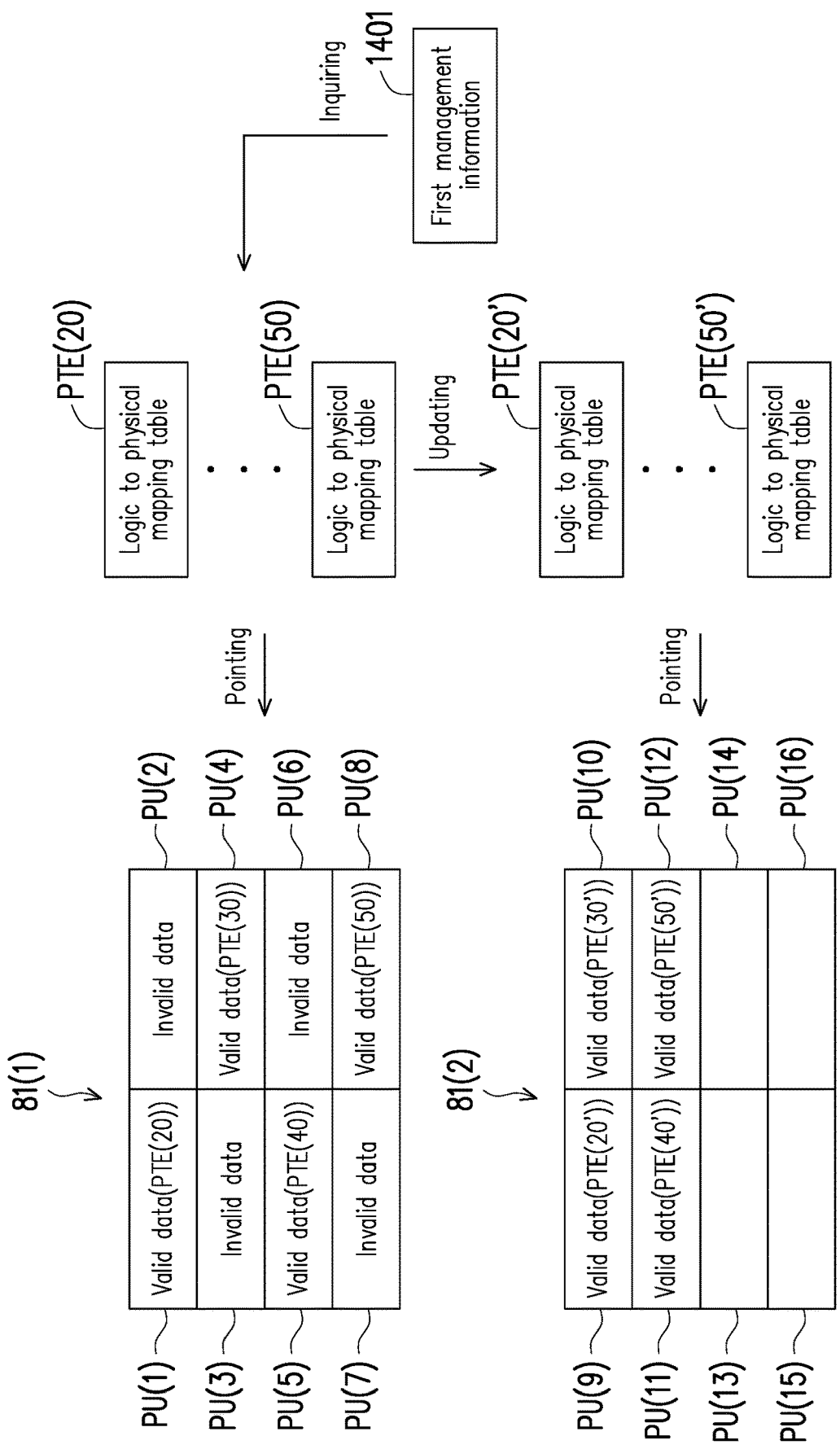
FIG. 14 is a schematic diagram illustrating first management information updated according to an exemplary embodiment of the disclosure.

In an embodiment, after the valid data are completely copied into the management unit 81(2), the memory management circuit 502 stores the logical to physical mapping tables PTE(20'), PTE(30'), PTE(40') and PTE(50') into the rewritable non-volatile memory module 406, and updates the first management information according to the logical to physical mapping tables PTE(20'), PTE(30'), PTE(40') and PTE(50'). FIG. 14 is a schematic diagram illustrating first management information updated according to an exemplary embodiment of the disclosure. It is assumed that first management information 1401 includes the physical addresses of the logical to physical mapping tables PTE(20), PTE(30), PTE(40) and PTE(50). The memory management circuit 502 can obtain the physical addresses of the logical to physical mapping tables PTE(20'), PTE(30'), PTE(40') and PTE(50'), and update the physical addresses of the logical to physical mapping tables PTE(20), PTE(30), PTE (40) and PTE(50) in the first management information 1401 to the physical addresses of the logical to physical mapping tables PTE(20'), PTE(30'), PTE(40') and PTE(50').

In an embodiment, the memory management circuit 502 updates the second management information. The memory management circuit 502 can change the identification information of the logical to physical mapping tables PTE(20), PTE(30), PTE(40) and PTE(50) in FIG. 11 to bit "0", indicating that the logical to physical mapping tables PTE(20), PTE(30), PTE(40) and PTE(50) are not mapped to the management unit stored with the valid data.

Here, after the valid data are collected in this exemplary embodiment, the memory management circuit 502 copies the logical to physical mapping tables, temporarily stores them in the buffer memory 510, and then updates the copied and generated logical to physical mapping tables according to the physical address of the recycling unit expected to be written. Therefore, the operation of repeatedly reading the logic to physical mapping table can be reduced, thereby improving the execution efficiency of the data merging operation.

It should be noted that, regarding the copied and generated logical to physical mapping tables PTE(20'), PTE(30'), PTE(40') and PTE(50') updated in this exemplary embodiment, if a data read command is received when the valid data are not completely written into the physical units PU(9) to PU(12) in the management unit 81(2), the memory management circuit 502 obtains the physical addresses of the logical to physical mapping tables PTE(20), PTE(30), PTE(40) and PTE(50) according to the first management information. Here, because the memory management circuit 502 has not updated the physical addresses of the logical to physical mapping tables PTE(20), PTE(30), PTE(40) and PTE(50) in the first management information 1401 to the physical addresses of the logical to physical mapping tables PTE(20'), PTE(30'), PTE(40') and PTE(50'), the memory management circuit 502 can read the data stored in the physical units PU(1), PU(4), PU(5) and PU(8), thereby avoiding reading the physical units PU(9) to PU(12).

In an exemplary embodiment, if a trim command or a mapping table for updating the management units accessed by the host system 11 is received when the valid data collected by the memory management circuit 502 are not completely written into the physical units PU(9) to PU(12) in the management unit 81(2), a conflict between the new and old logical to physical mapping tables will be an issue to be addressed. In this exemplary embodiment, when receiving the trim command or the mapping table for updating the management units accessed by the host system 11, the memory management circuit 502 first determines whether a logical to physical mapping table updated by the trim command or the mapping table for updating the management units accessed by the host system 11 is identical to at least one of the logical to physical mapping tables PTE(20), PTE(30), PTE(40) and PTE(50). If so, the memory management circuit 502 copies the valid data remaining in the management unit 81(1) to the management unit 81(2), and updates the first management information according to the logical to physical mapping tables PTE(20'), PTE(30'), PTE(40') and PTE(50'). Next, the memory management circuit 502 executes the trim command or the mapping table for updating the management units accessed by the host system 11 according to the logical to physical mapping tables PTE(20'), PTE(30'), PTE(40') and PTE(50'). If not, the memory management circuit 502 can separately execute the trim command or the mapping table for updating the management units accessed by the host system 11 and the data merging operation. In other words, when the memory management circuit 502 handles the trim command or the mapping table for updating the management units accessed by the host system 11, if the involved logical to physical mapping table is identical to the first logical to physical mapping table, the memory management circuit 502 first copies the valid data remaining in the source unit to the recycling unit, and preferentially update the trim command or the mapping table for updating the management units accessed by the host system 11 to be pointing to the second logical to physical mapping table. Here, when the trim command or the mapping table for updating the management units accessed by the host system 11 is executed, the physical unit not written with the valid data (e.g., the physical units PU(9) to PU(12) not written with the valid data in FIG. 13) may be prevent from being read.

In another embodiment, if the trim command or the mapping table for updating the management units accessed by the host system 11 is received when the collected valid data are not completely written into the physical units PU(9) to PU(12) in the management unit 81(2), the memory management circuit 502 can directly copy the valid data remaining in the management unit 81(1) to the management unit 81(2), and update the first management information according to the logical to physical mapping tables PTE(20'), PTE(30'), PTE(40') and PTE(50') before executing the trim command or the mapping table for updating the management units accessed by the host system 11. Here, by completely copying the valid data to the recycling unit and updating the first management information before executing the trim command or the mapping table for updating the management units accessed by the host system 11, the physical unit not written with the valid data may be prevent from being read when the trim command or the mapping table for updating the management units accessed by the host system 11 is executed.

It should be noted that, the trim command refers to a command for informing of the logical addresses in which the data are no longer used or already deleted. For example, the trim command may also be referred to as a delete command, a remove command or other commands having similar functions. In particular, when determining that the trim command is received, the memory management circuit 502 records information related to the trim command (e.g., the logical addresses in which the data are deleted) in a trim table, and transmits an acknowledge message to the host system 11 in response to the trim command, so as to rapidly respond to the host system 11 to avoid delay or time out. The memory management circuit 502 will start a trim operation at a proper timing to perform an operation corresponding to the trim command recorded in the trim table. For example, according to the logical addresses indicated by the trim command, the memory management circuit 502 starts the trim operation to update a mapping of the indicated logical addresses to a null value in the logical to physical mapping table, so as to indicate that the physical units originally mapped to the indicated logical addresses no longer include the valid data.

It should be noted that, in the exemplary embodiment of FIG. 10 to FIG. 14, the table information 1101, the management unit 81(1), the management unit 81(2) and the first management information 1401 are all examples instead of limitations to the disclosure. Further, in another exemplary embodiment of FIG. 10 to FIG. 14, after the valid data are collected from the physical units PU(1) to PU(8), the management unit 81(1) may then be erased.

Figure 15:
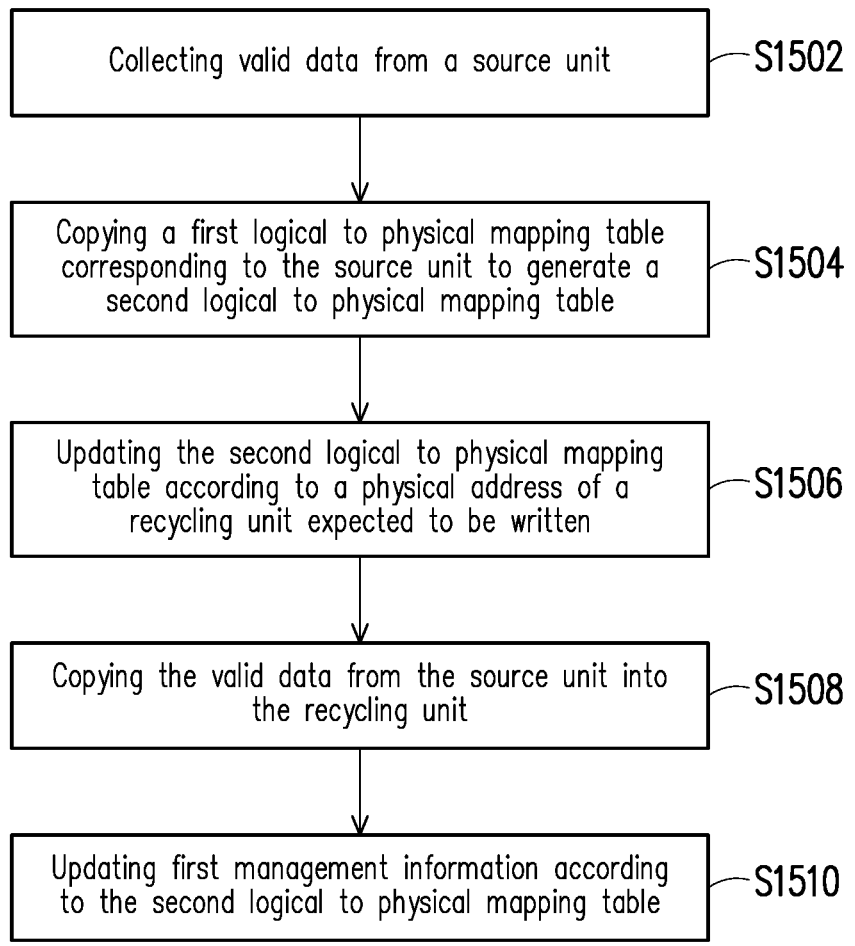
FIG. 15 is a flowchart illustrating a memory control method according to an exemplary embodiment of the disclosure.

FIG. 15 is a flowchart illustrating a memory control method according to an exemplary embodiment of the disclosure. Referring to FIG. 15, in step S1502, valid data are collected from a source unit. In step S1504, a first logical to physical mapping table corresponding to the source unit is copied to generate a second logical to physical mapping table. In step S1506, the second logical to physical mapping table is updated according to a physical address of a recycling unit expected to be written. In step S1508, the valid data are copied from the source unit to the recycling unit. In step S1510, first management information is updated according to the second logical to physical mapping table.

Figure 16:
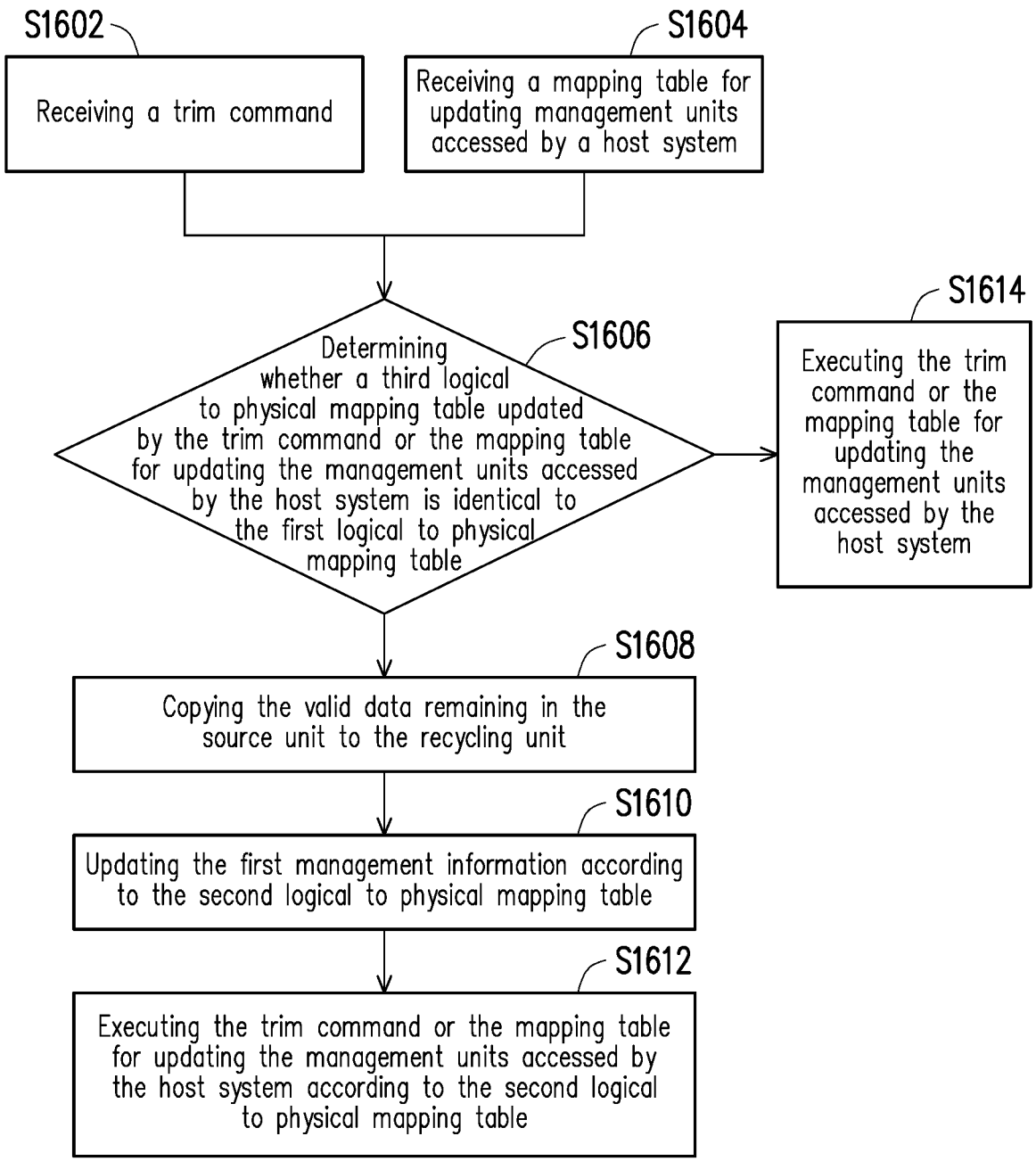
FIG. 16 is a flowchart illustrating a memory control method according to an exemplary embodiment of the disclosure.

FIG. 16 is a flowchart illustrating a memory control method according to an exemplary embodiment of the disclosure. Referring to FIG. 16, a trim command is received in step S1602, or a mapping table for updating management units accessed by a host system is received in step S1604. In step S1606, whether a logical to physical mapping table updated by the trim command or the mapping table for updating the management units accessed by the host system is identical to the first logical to physical mapping table is determined. If the logical to physical mapping table updated by the trim command or the mapping table for updating the management units accessed by the host system is identical to the first logical to physical mapping table ("YES" for step S1606), the valid data remaining in the source unit are copied to the recycling unit in step S1608. In step S1610, the first management information are updated according to the second logical to physical mapping table. Then, in step S1612, the trim command or the mapping table for updating the management units accessed by the host system is executed according to the second logical to physical mapping table. If the logical to physical mapping table updated by the trim command or the mapping table for updating the management units accessed by the host system is different from the first logical to physical mapping table ("NO" for step S1606), the trim command or the mapping table for updating the management units accessed by the host system is executed in step S1614.

Nevertheless, each of steps depicted in FIG. 15 and FIG. 16 have been described in detail as above, thus related description thereof is not repeated hereinafter. It should be noted that, the steps depicted in FIG. 15 and FIG. 16 may be implemented as a plurality of program codes or circuits, which are not particularly limited in the disclosure. Moreover, the methods disclosed in FIG. 15 and FIG. 16 may be implemented with reference to above embodiments, or may be implemented separately, which are not particularly limited in the disclosure.

In summary, according to the memory control method, the memory storage device and the memory control circuit unit provided by the disclosure, the valid data in the source unit are collected while the logic to physical mapping table corresponding to the source unit is copied, and the copied logic to physical mapping table is updated according to the physical address of the recycling unit expected to be written. In this way, the number of times that the same logic to physical mapping table is read multiple times during the data merging operation can be reduced to effectively shorten the time for executing the data merging operation and/or improve the execution efficiency of the data merging operation, thereby increasing the system performance of the memory storage device.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

The previously described exemplary embodiments of the present disclosure have the advantages aforementioned, wherein the advantages aforementioned not required in all versions of the present disclosure.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A memory control method for a rewritable non-volatile memory module, wherein the rewritable non-volatile memory module comprises a plurality of management units, the management units comprise a source unit and a recycling unit, and the memory control method comprises:
   collecting valid data from the source unit; copying a first logical to physical mapping table corresponding to the source unit to generate a second logical to physical mapping table;
   expecting a physical address of the recycling unit, updating the second logical to physical mapping table according to the physical address of the recycling unit, wherein the second logical to physical mapping table is recorded with mapping information corresponding to the recycling unit;
   copying the valid data from the source unit into the physical address of the recycling unit which is expected to be written; and
   obtaining a physical address of the second logical to physical mapping table after copying the valid data from the source unit into the recycling unit, and updating a physical address of the first logical to physical mapping table in first management information to the physical address of the second logical to physical mapping table,
   wherein if a trim command or a command for updating mapping table of the management units accessed by a host system is received when the valid data are not completely copied from the source unit to the recycling unit,
   determining whether a third logical to physical mapping table updated by the trim command or the command for updating mapping table of the management units accessed by the host system is identical to the first logical to physical mapping table,
   if the third logical to physical mapping table is not identical to the first logical to physical mapping table, separately executing the trim command or the command for updating mapping table of the management units accessed by the host system and the data merging operation.

2. The memory control method of claim 1, wherein the step of updating the second logical to physical mapping table according to the physical address of the recycling unit expected to be written comprises:
   removing a mapping relation between a first physical node belonging to the source unit and a logical address corresponding to the first physical node in the second logical to physical mapping table; and
   establishing a mapping relation between the logical address and a second physical node belonging to a second physical unit of the recycling unit expected to be written.

3. The memory control method of claim 1, wherein the method further comprises:
   if the third logical to physical mapping table is identical to the first logical to physical mapping table, copying the valid data remaining in the source unit to the recycling unit, updating the first management information according to the second logical to physical mapping table, and executing the trim command or the mapping table for updating the management units accessed by the host system according to the second logical to physical mapping table.

4. The memory control method of claim 1, wherein the method further comprises:
   if a trim command or a mapping table for updating the management units accessed by a host system is received when the valid data is not completely copied from the source unit to the recycling unit, copying the valid data remaining in the source unit to the recycling unit.

5. The memory control method of claim 4, wherein the method further comprises:
   before executing the trim command or the mapping table for updating the management units accessed by the host system, updating the first management information according to the second logical to physical mapping table.

6. The memory control method of claim 1, wherein the step of collecting the valid data from the source unit comprises:
   obtaining a plurality of logical to physical mapping tables stored with the valid data according to second management information, and determining the source unit according to the plurality of logical to physical mapping tables; and
   collecting the valid data from the determined source unit.

7. A memory storage device, comprising:
   a connection interface unit configured to couple to a host system;
   a rewritable non-volatile memory module, wherein the rewritable non-volatile memory module comprises a plurality of management units, and the management units comprise a source unit and a recycling unit; and
   a memory control circuit unit, coupled to the connection interface unit and the rewritable non-volatile memory module,
   wherein the memory control circuit unit is configured to collect valid data from the source unit,
   the memory control circuit unit is further configured to copy a first logical to physical mapping table corresponding to the source unit to generate a second logical to physical mapping table,
   the memory control circuit unit is further configured to expect a physical address of the recycling unit, update the second logical to physical mapping table according to the physical address of the recycling unit, wherein the second logical to physical mapping table is recorded with mapping information corresponding to the recycling unit,
   the memory control circuit unit is further configured to copy the valid data from the source unit into the physical address of the recycling unit which is expected to be written, and
   the memory control circuit unit is further configured to obtain a physical address of the second logical to physical mapping table after copying the valid data from the source unit into the recycling unit, and update a physical address of the first logical to physical mapping table in first management information to the physical address of the second logical to physical mapping table,
   wherein if a trim command or a mapping table for updating the management units accessed by a host system is received when the valid data is not completely copied from the source unit to the recycling unit,
   the memory control circuit unit is further configured to determine whether a third logical to physical mapping table updated by the trim command or the mapping table for updating the management units accessed by the host system is identical to the first logical to physical mapping table,
   if the third logical to physical mapping table is not identical to the first logical to physical mapping table, the memory control circuit unit is further configured to separately execute the trim command or the mapping table for updating the management units accessed by the host system and the data merging operation.

8. The memory storage device of claim 7, wherein in the operation that the memory control circuit unit updates the second logical to physical mapping table according to the physical address of the recycling unit expected to be written,
   the memory control circuit unit is further configured to remove a mapping relation between a first physical node belonging to the source unit and a logical address corresponding to the first physical node in the second logical to physical mapping table, and
   the memory control circuit unit is further configured to establish a mapping relation between the logical address and a second physical node belonging to a second physical unit of the recycling unit expected to be written.

9. The memory storage device of claim 7, wherein
   if the third logical to physical mapping table is identical to the first logical to physical mapping table, the memory control circuit unit is further configured to copy the valid data remaining in the source unit to the recycling unit, update the first management information according to the second logical to physical mapping table, and execute the trim command or the mapping table for updating the management units accessed by the host system according to the second logical to physical mapping table.

10. The memory storage device of claim 7, wherein if a trim command or a mapping table for updating the management units accessed by a host system is received when the valid data is not completely copied from the source unit to the recycling unit, the memory control circuit unit is further configured to copy the valid data remaining in the source unit to the recycling unit.

11. The memory storage device of claim 10, wherein the memory control circuit unit is further configured to update the first management information according to the second logical to physical mapping table before executing the trim command or the mapping table for updating the management units accessed by the host system.

12. The memory storage device of claim 7, wherein in the operation that the memory control circuit unit is configured to collect the valid data from the source unit,
    the memory control circuit unit is further configured to obtain a plurality of logical to physical mapping tables stored with the valid data according to second management information and determine the source unit according to the plurality of logical to physical mapping tables, and
    the memory control circuit unit is further configured to collect the valid data from the determined source unit.

13. A memory control circuit unit for controlling a rewritable non-volatile memory module, wherein the rewritable non-volatile memory module comprises a plurality of management units, and the management units comprise a source unit and a recycling unit, wherein the memory control circuit unit comprises:

a host interface, configured to couple to a host system, a memory interface, configured to couple to the rewritable non-volatile memory module; and a memory management circuit, coupled to the host interface and the memory interface;

wherein the memory management circuit is configured to collect valid data from the source unit, the memory management circuit is further configured to copy a first logical to physical mapping table corresponding to the source unit to generate a second logical to physical mapping table, the memory management circuit is further configured to expect a physical address of the recycling unit, update the second logical to physical mapping table according to the physical address of the recycling unit, wherein the second logical to physical mapping table is recorded with mapping information corresponding to the recycling unit, the memory management circuit is further configured to copy the valid data from the source unit into the physical address of the recycling unit which is expected to be written, and the memory management circuit is further configured to obtain a physical address of the second logical to physical mapping table after copying the valid data from the source unit into the recycling unit, and update a physical address of the first logical to physical mapping table in first management information to the physical address of the second logical to physical mapping table, if a trim command or a mapping table for updating the management units accessed by a host system is received when the valid data is not completely copied from the source unit to the recycling unit, the memory management circuit is further configured to determine whether a third logical to physical mapping table updated by the trim command or the mapping table for updating the management units accessed by the host system is identical to the first logical to physical mapping table, if the third logical to physical mapping table is not identical to the first logical to physical mapping table, the memory management circuit is further configured to separately execute the trim command or the mapping table for updating the management units accessed by the host system and the data merging operation.

14. The memory control circuit unit of claim 13, wherein in the operation that the memory management circuit updates the second logical to physical mapping table according to the physical address of the recycling unit expected to be written, the memory management circuit is further configured to remove a mapping relation between a first physical node belonging to the source unit and a logical address corresponding to the first physical node in the second logical to physical mapping table, and the memory management circuit is further configured to establish a mapping relation between the logical address and a second physical node belonging to a second physical unit of the recycling unit expected to be written.

15. The memory control circuit unit of claim 13, wherein if the third logical to physical mapping table is identical to the first logical to physical mapping table, the memory management circuit is further configured to copy the valid data remaining in the source unit to the recycling unit, update the first management information according to the second logical to physical mapping table, and execute the trim command or the mapping table for updating the management units accessed by the host system according to the second logical to physical mapping table.

16. The memory control circuit unit of claim 13, wherein if a trim command or a mapping table for updating the management units accessed by a host system is received when the valid data is not completely copied from the source unit to the recycling unit, the memory management circuit is further configured to copy the valid data remaining in the source unit to the recycling unit.

17. The memory control circuit unit of claim 16, wherein the memory management circuit is further configured to update the first management information according to the second logical to physical mapping table before executing the trim command or the mapping table for updating the management units accessed by the host system.

18. The memory control circuit unit of claim 13, wherein in the operation that the memory management circuit is configured to collect the valid data from the source unit, the memory management circuit is further configured to obtain a plurality of logical to physical mapping tables stored with the valid data according to second management information and determine the source unit according to the plurality of logical to physical mapping tables, and the memory management circuit is further configured to collect the valid data from the determined source unit.

* * * * *